United States Patent
Zhou et al.

(10) Patent No.: US 11,885,259 B1
(45) Date of Patent: Jan. 30, 2024

(54) AMMONIA-HYDROGEN BLENDED FUEL CONTROL SYSTEM BASED ON REACTIVITY REGULATION

(71) Applicant: TIANJIN UNIVERSITY, Tianjin (CN)

(72) Inventors: Lei Zhou, Tianjin (CN); Zongkuan Liu, Tianjin (CN); Haiqiao Wei, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 18/190,609

(22) Filed: Mar. 27, 2023

(30) Foreign Application Priority Data

Jul. 15, 2022 (CN) .......................... 202210830675.3

(51) Int. Cl.
*F02B 43/12* (2006.01)
*F02B 17/00* (2006.01)
(Continued)

(52) U.S. Cl.
CPC ............ *F02B 43/12* (2013.01); *F02B 17/005* (2013.01); *F02B 19/10* (2013.01);
(Continued)

(58) Field of Classification Search
CPC ............. F02D 19/0644; F02D 19/0671; F02D 19/0689; F02D 19/0692; F02D 19/0694; F02B 19/10; F02B 19/1028; F02B 19/1071; F02B 19/108; F02B 19/1085; F02B 19/19; F02B 2043/106; F02B 21/00; F02B 43/12; F02M 21/0206
See application file for complete search history.

(56) References Cited

U.S. PATENT DOCUMENTS 11,060,443 B1 * 7/2021 Thomas ................. F02M 61/14
2003/0200939 A1 * 10/2003 Hiltner .................... F02B 43/10
123/3

(Continued)

FOREIGN PATENT DOCUMENTS

CN 112796870 A * 5/2021 .......... F02B 19/1066
GB 2073317 A * 10/1981 ............. F02B 19/10
WO WO-2022221890 A1 * 10/2022

*Primary Examiner* — John M Zaleskas
(74) *Attorney, Agent, or Firm* — Gurr Brande & Spendlove, PLLC; Robert A. Gurr

(57) ABSTRACT

Disclosed is an ammonia-hydrogen blended fuel control system based on reactivity regulation. The control system comprises a vehicle-mounted ammonia-hydrogen fuel supply system, an ammonia-hydrogen blended fuel premixed combustion engine and an ECU (Electronic Control Unit). The ECU is used for regulating the air injection amount and pressure value of ammonia fuel and hydrogen waiting to enter the ammonia-hydrogen blended fuel premixed combustion engine. The vehicle-mounted ammonia-hydrogen fuel supply system comprises a low-pressure liquid ammonia supply unit and a vehicle-mounted hydrogen production unit, and is used for providing the prepared low-pressure ammonia fuel and hydrogen for the ammonia-hydrogen blended fuel premixed combustion engine. The ammonia-hydrogen blended fuel premixed combustion engine comprises a turbulent jet ignition device provided with a prechamber. An ammonia injector and a first hydrogen injector which face the cylinder head are respectively arranged on the air inlet pipe.

6 Claims, 4 Drawing Sheets

(51) Int. Cl.
  *F02D 19/06*  (2006.01)
  *F02B 19/10*  (2006.01)
  *F02B 43/10*  (2006.01)

(52) U.S. Cl.
  CPC ...... *F02B 19/1085* (2013.01); *F02D 19/0644* (2013.01); *F02D 19/0671* (2013.01); *F02D 19/0689* (2013.01); *F02D 19/0692* (2013.01); *F02D 19/0694* (2013.01); *F02B 2043/106* (2013.01)

(56) References Cited

U.S. PATENT DOCUMENTS

| | | | |
|---|---|---|---|
| 2011/0259290 A1* | 10/2011 | Michikawauchi | F02D 19/0692 123/1 A |
| 2011/0264355 A1* | 10/2011 | Iwatani | F02M 43/00 123/575 |
| 2015/0354481 A1* | 12/2015 | Geckler | F02B 19/108 123/274 |
| 2016/0230645 A1* | 8/2016 | Schock | F02B 19/1052 |
| 2016/0265416 A1* | 9/2016 | Ge | B01J 12/007 |
| 2018/0003132 A1* | 1/2018 | Ginter | F02B 19/1019 |
| 2021/0164407 A1* | 6/2021 | Heggen | F02M 25/12 |
| 2021/0262408 A1* | 8/2021 | Glugla | F02D 41/3094 |
| 2022/0025826 A1* | 1/2022 | Gallagher | F02D 25/00 |
| 2022/0268200 A1* | 8/2022 | Seba | F02B 43/02 |
| 2023/0220809 A1* | 7/2023 | Zhou | F02B 19/1085 123/295 |

\* cited by examiner

AMMONIA-HYDROGEN BLENDED FUEL CONTROL SYSTEM BASED ON REACTIVITY REGULATION

CROSS-REFERENCE TO RELATED APPLICATION

This patent application claims the benefit and priority of Chinese Patent Application No. 202210830675.3, filed with the China National Intellectual Property Administration on Jul. 15, 2022, the disclosure of which is incorporated by reference herein in its entirety as part of the present application.

TECHNICAL FIELD

The present disclosure belongs to the technical field of internal combustion engines, and particularly relates to an ammonia-hydrogen blended fuel control system based on reactivity regulation.

BACKGROUND

With the continuous increase of traditional energy demand and the prominent global warming problem, main automobile producing countries in the world have accelerated the deployment, taking the development of clean energy vehicles as a national strategy, and developing carbon-free fuels as an important solution to reduce carbon emissions. The historical background drives the traditional internal combustion engine to develop through the technical route of efficient and clean combustion. In recent years, the technology of the internal combustion engine becomes continuously maturing, and the thermal efficiency is continuously increased. However, the source of carbon emission and pollutant emission of the internal combustion engine lies in the elemental composition of fuel. Therefore, low carbon, carbon neutrality and zero carbonization of internal combustion engine fuel will be the future trends of the internal combustion engine.

The essence of the zero-carbon technology of the internal combustion engine is to burn carbon-neutral fuel to achieve zero-carbon emission in the whole life cycle. Hydrogen energy has attracted much attention because of the characteristics of good combustion performance, near-zero pollutant emission and renewable energy production. The development of hydrogen energy industry is an important starting point for implementing the "double carbon" strategy. However, the problems of difficulty in hydrogen storage and transportation and poor safety restrict the industrialization development. It is found that ammonia, as an efficient hydrogen storage medium, has the advantages of high energy density, easy liquefaction, storage and transportation, high safety, no carbon emission and the like. Hydrogen can be produced from renewable energy, and then converted into ammonia and transported to the destination, so that the transportation cost of hydrogen can be greatly reduced, and the safety performance of transportation is improved. Ammonia is not only a carrier of hydrogen energy, but also zero-carbon fuel. For a certain volume of liquid ammonia, the hydrogen content and energy density are 1.7 and 1.5 times of the same volume of liquid hydrogen respectively. In addition, ammonia can be synthesized from air and water by renewable energy such as solar energy and electric energy, and the whole preparation process is free of carbon emission. China has a vast territory and is rich in renewable energy such as solar energy and wind energy. A good industrial production foundation is beneficial to gradually realizing the transformation from fossil energy to renewable ammonia energy. At present, a number of domestic scientific research institutes and enterprises have begun to plan the layout of the hydrogen and ammonia industrial chain. Fujian, Ningxia and other places in China and the Chinese National Energy Group have set up relevant alliance organization seminars to seize the opportunities. Therefore, the development of ammonia-hydrogen blended fuel power accords with the current situation of energy structure in China and the future strategic adjustment.

The main challenge for the development of ammonia as engine fuel comes from the poor combustion characteristics of ammonia, such as high auto-ignition temperature, low flame speed and high latent heat of vaporization. The poor auto-ignition ability and combustion stability lead to the need for high ignition energy when the ammonia is used as engine fuel. Unstable ignition and combustion directly lead to deterioration of engine power performance and emission performance, and cause ammonia leakage. However, ammonia gas is corrosive and weakly toxic. Once ammonia gas leaks, the ammonia gas will corrode and damage engine parts and endanger personnel safety. Therefore, the stable ignition and flame propagation process in the cylinder is of great significance to engine combustion process optimization, emission control and safety guarantee. How to achieve stable ignition and efficient combustion of ammonia fuel is one of the key technologies in the development of ammonia engines. Ammonia is easy to prepare hydrogen, and the combustion speed of hydrogen is high (3 m/s), ammonia-hydrogen blended fuel can be formed by vehicle-mounted hydrogen production and ammonia gas. According to the change of engine load and rotation speed, the fuel ratio can be regulated in real time, so that efficient and clean combustion can be realized. Therefore, vehicle-mounted ammonia cracking hydrogen production technology and ammonia-hydrogen fuel mixture ratio control technology are the key technologies for the performances of ammonia-fueled heavy-duty internal combustion engines.

SUMMARY

The purpose of the present disclosure is to provide an ammonia-hydrogen blended fuel control system based on reactivity regulation. Through a vehicle-mounted ammonia-hydrogen fuel supply system, hydrogen and ammonia fuel are injected at low pressure during the air inlet forming process to form ammonia-hydrogen blended fuel with controllable reactivity, and finally an internal combustion engine can realize high-efficiency combustion and zero carbon emission at the same time. The purpose of the present disclosure is realized through the following technical scheme.

Disclosed is an ammonia-hydrogen blended fuel control system based on reactivity regulation, wherein the control system includes a vehicle-mounted ammonia-hydrogen fuel supply system, an ammonia-hydrogen blended fuel premixed combustion engine and an ECU (Electronic Control Unit);

the ECU is used for controlling the ammonia-hydrogen blended fuel premixed combustion engine and the vehicle-mounted ammonia-hydrogen fuel supply system and regulating the air injection quantity and pressure value of ammonia fuel and hydrogen waiting to enter the ammonia-hydrogen blended fuel premixed combustion engine;

the vehicle-mounted ammonia-hydrogen fuel supply system includes a low-pressure liquid ammonia supply unit and a vehicle-mounted hydrogen production unit, and is used for providing the prepared low-pressure ammonia fuel and hydrogen for the ammonia-hydrogen blended fuel premixed combustion engine, wherein the low-pressure liquid ammonia supply unit is used for providing ammonia fuel with a pressure range of 0.5-1 MPa, and the vehicle-mounted hydrogen production unit is used for providing hydrogen with a pressure range of 1.0-2.0 MPa;

the ammonia-hydrogen blended fuel premixed combustion engine includes an engine cylinder head, a cylinder sleeve, a piston, a main combustion chamber, an air inlet pipe and an exhaust channel, and also includes a turbulent jet ignition device arranged on the cylinder head and provided with a pre-chamber, wherein an ammonia injector and a first hydrogen injector which face the cylinder head are respectively arranged on the air inlet pipe, and the ammonia fuel and hydrogen which are injected into the air inlet pipe form ammonia-hydrogen blended fuel in the air inlet pipe; the turbulent jet ignition device is used for realizing the double injection mode of air and hydrogen injection alone and the scavenging mode of air injection alone, or the air entrainment injection mode of hydrogen-air mixture injection and the scavenging mode of hydrogen-air mixture injection;

in the working process of the control system, the low-pressure liquid ammonia supply unit generates ammonia fuel with the pressure of 0.5-1.0 MPa under the regulation of the ECU, and then the prepared ammonia fuel is divided into two paths, one part of the prepared ammonia fuel enters the ammonia injector through a pipeline, and the other part of the prepared ammonia fuel enters the vehicle-mounted hydrogen production unit to participate in hydrogen production; and the vehicle-mounted hydrogen production unit generates hydrogen with the pressure of 1.0-2.0 MPa under the regulation of the ECU, and then the hydrogen is divided into two paths, one part of the hydrogen is injected into the air inlet pipe by the first hydrogen injector, and the hydrogen injected from the air inlet pipe is mixed with the ammonia fuel to form the ammonia-hydrogen blended fuel in the air inlet pipe, wherein the hydrogen injection amount of the first hydrogen injector is regulated by the ECU so that the ammonia-hydrogen blended fuel with adjustable reactivity can be realized in the air inlet pipe, the other part of the hydrogen is supplied to the turbulent jet ignition device and ignited by a spark plug in a pre-chamber cavity to form a jet flame in the main combustion chamber, and then the ammonia-hydrogen blended fuel is ignited in the main combustion chamber to complete combustion work.

Further, the low-pressure liquid ammonia supply unit includes an ammonia storage tank, a heater, a pressure stabilizing tank and a pressure controller which are connected in sequence, and the ammonia storage tank is filled with liquid ammonia; and the vehicle-mounted hydrogen production unit includes a vehicle-mounted hydrogen production device, a high-pressure hydrogen storage tank and a pressure controller which are connected in sequence.

Further, an air inlet valve is arranged in the air inlet pipe, an exhaust valve is arranged in the exhaust channel, and the air inlet valve and the exhaust valve are respectively arranged on the left and right sides of the cylinder head, and the air inlet valve and the exhaust valve are used for changing the air inflow in combination with the throttle valve of the engine.

Further, the turbulent jet ignition device includes a pre-chamber cavity, a spark plug, an air injector and a second hydrogen injector; the nozzle of the air injector extends into the pre-chamber cavity for injecting air into the pre-chamber cavity, and the nozzle of the second hydrogen injector extends into the pre-chamber cavity for injecting hydrogen into the pre-chamber cavity; the spark plug, the nozzle of the air injector and the nozzle of the second hydrogen injector are arranged on the same side of the pre-chamber; jet holes are formed in the bottom of the turbulent jet ignition device, and the pre-chamber cavity communicates with the main combustion chamber through the jet holes; and the turbulent jet ignition device has two working modes, namely the double injection mode and the scavenging mode;

when the ECU controls the turbulent jet ignition device to be in the double injection mode, the air injector and the second hydrogen injector respectively inject fresh air and hydrogen into the pre-chamber cavity for forming stoichiometric gas mixture inside the pre-chamber; and when the ECU controls the turbulent jet ignition device to be in the scavenging mode, only the air injector injects fresh air into the pre-chamber cavity to scavenge the pre-chamber.

Further, the turbulent jet ignition device includes a pre-chamber cavity, a spark plug and a second hydrogen injector; the second hydrogen injector is provided with a high-pressure premixing cavity and an electromagnetic valve in sequence downward, and the nozzle at the bottom of the electromagnetic valve extends into the pre-chamber cavity for injecting hydrogen and gas mixture into the pre-chamber cavity; the side wall of that high-pressure premixing cavity communicates with an air inlet for premixing high-pressure air with hydrogen from the second hydrogen injector; the nozzle of the spark plug extends into the pre-chamber cavity; jet holes are formed in the bottom of the turbulent jet ignition device, and the pre-chamber cavity communicates with the main combustion chamber through the jet holes; the turbulent jet ignition device has two working modes, namely, the air entrainment injection mode and the scavenging mode;

when the ECU controls the turbulent jet ignition device to be in the air entrainment injection mode, hydrogen from the second hydrogen injector and high-pressure air are mixed in the high-pressure premixing cavity, and then the mixture of air and hydrogen is injected by an electromagnetic valve to form equivalent gas mixture in the pre-chamber;

when the ECU controls the turbulent jet ignition device to be in the scavenging mode, the electromagnetic valve injects twice, and fresh air is injected into the pre-chamber cavity for the first time to scavenge the pre-chamber; and then, hydrogen from the second hydrogen injector and high-pressure air are mixed in the high-pressure premixing cavity to form gas mixture, and the gas mixture is injected into the pre-chamber by the electromagnetic valve for the second time.

Further, the ammonia injector is a liquid ammonia low-pressure injector, and the first hydrogen injector is provided with a hydrogen low-pressure nozzle.

Further, the vehicle-mounted hydrogen production device is heated by the engine waste heat of the ammonia-hydrogen blended fuel premixed combustion engine, or an electric heating device is separately installed for heat supply.

Compared with the prior art, the present disclosure has the following beneficial effects.

Firstly, two injectors are installed in the air inlet pipe, the ammonia-hydrogen blended fuel with controllable reactivity is formed in the air inlet pipe through the regulation of the ECU, and the combustion reaction rate of the ammonia-hydrogen blended fuel is regulated according to the actual operating conditions of the engine, so that the problem that the propagation speed of the ammonia combustion flame is low is solved, and the combustion stability of the engine is improved.

Secondly, through the vehicle-mounted ammonia-hydrogen fuel supply system provided by the present disclosure, low-pressure ammonia fuel and low-pressure hydrogen fuel can be prepared. The hydrogen generated by the vehicle-mounted ammonia-hydrogen fuel supply system is used for the turbulent jet ignition device, so that the ignition capability of the engine can be greatly improved.

Thirdly, the turbulent jet ignition device provides two working modes. In the scavenging mode, the jet ignition intensity is improved by injecting hydrogen into the pre-chamber, the problem of difficult ignition of ammonia combustion is solved, and the flame propagation speed of ammonia fuel is further improved, so that the ammonia fuel internal combustion engine can always work in high-efficiency conditions and realize zero emission of carbon dioxide.

Meanwhile, the present disclosure can be extended to other hydrogen-based fuels, such as alcohols, ethers and the like.

Reference signs:

1, piston; 2, main combustion chamber; 3, air inlet valve; 4, ammonia injector; 5, first hydrogen injector; 6, turbulent jet ignition device;

7, jet flame; 8, exhaust valve; 9, cylinder head;

10, cylinder sleeve; 11, 21, pre-chamber cavity; 12, 16, spark plug;

13, air injector; 14, compression bolt; 15, 17, second hydrogen injector;

18, high-pressure premixing cavity; 19, air inlet; and 20, electromagnetic valve.

DETAILED DESCRIPTION OF THE EMBODIMENTS

In order to make the objectives, technical solutions and beneficial technical effects of this application clearer, the following clearly and completely describes the technical scheme in the embodiments of the present disclosure with reference to the attached figures in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

The present disclosure provides an ammonia-hydrogen blended fuel control system based on reactivity regulation. An ammonia-hydrogen blended fuel in a cylinder by injecting ammonia fuel and hydrogen into an air inlet pipe, and the reactivity of the ammonia-hydrogen blended fuel is regulated by controlling the injection amount of hydrogen. The hydrogen required by the device comes from a vehicle-mounted hydrogen production device and is prepared from ammonia fuel. At the same time, the prepared hydrogen can be supplied to a pre-chamber as the fuel of the pre-chamber to be matched with a turbulent jet ignition device. A jet flame is formed to ignite mixture in a main combustion chamber so that the ignition performance of an engine is improved. The working process of the device is further explained with reference to the attached figures.

Figure 1:
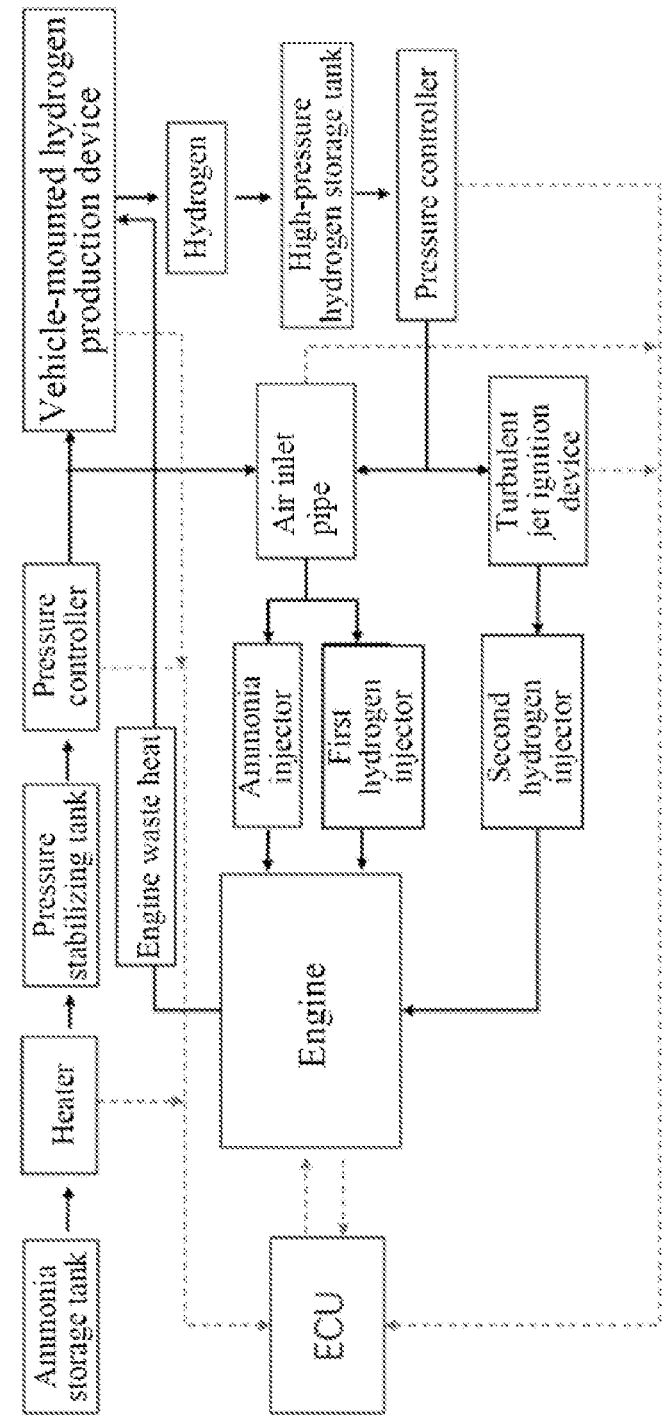
FIG. 1 is a schematic diagram of an ammonia-hydrogen blended fuel control system based on reactivity regulation.

As shown in FIG. 1, an ammonia-hydrogen blended fuel control system based on reactivity regulation includes a vehicle-mounted ammonia-hydrogen fuel supply system, an ammonia-hydrogen blended fuel premixed combustion engine and an ECU (Electronic Control Unit).

The vehicle-mounted ammonia-hydrogen fuel supply system includes a low-pressure liquid ammonia supply unit and a vehicle-mounted hydrogen production unit, wherein the low-pressure liquid ammonia supply unit is used for providing low-pressure ammonia fuel with a pressure range of 0.5-1 MPa and includes an ammonia storage tank, a heater, a pressure stabilizing tank and a pressure controller which are connected in sequence, and the ammonia storage tank is filled with liquid ammonia. The vehicle-mounted hydrogen production unit is used for providing low-pressure hydrogen with a pressure range of 1.0-2.0 MPa and includes a vehicle-mounted hydrogen production device, a high-pressure hydrogen storage tank and a pressure controller which are connected in sequence. The pressure controller is used for controlling the pressure of ammonia fuel and hydrogen, the pressure output by the low-pressure liquid ammonia supply unit is preferably 0.8 MPa, and the pressure output by the vehicle-mounted hydrogen production unit is preferably 1.0 MPa. One path of the prepared low-pressure ammonia fuel (which can be ammonia or liquid ammonia) flows into an ammonia injector 4 of the ammonia-hydrogen blended fuel premixed combustion engine, and the other path of the prepared low-pressure ammonia fuel flows into the vehicle-mounted hydrogen production unit for hydrogen production. The prepared low-pressure hydrogen divided into two paths is sent to the ammonia-hydrogen blended fuel premixed combustion engine, one path of the prepared low-pressure hydrogen is sent to the first hydrogen injector 5 to participate in combustion work, and the other path of the prepared low-pressure hydrogen is sent to the turbulent jet ignition device 6 to participate in pre-combustion in the pre-chamber.

The ECU is used for controlling the ammonia-hydrogen blended fuel premixed combustion engine, the vehicle-mounted hydrogen production unit and the pressure controller and regulating the air injection quantity and pressure value of ammonia fuel and hydrogen waiting to enter the ammonia-hydrogen blended fuel engine.

Figure 2:
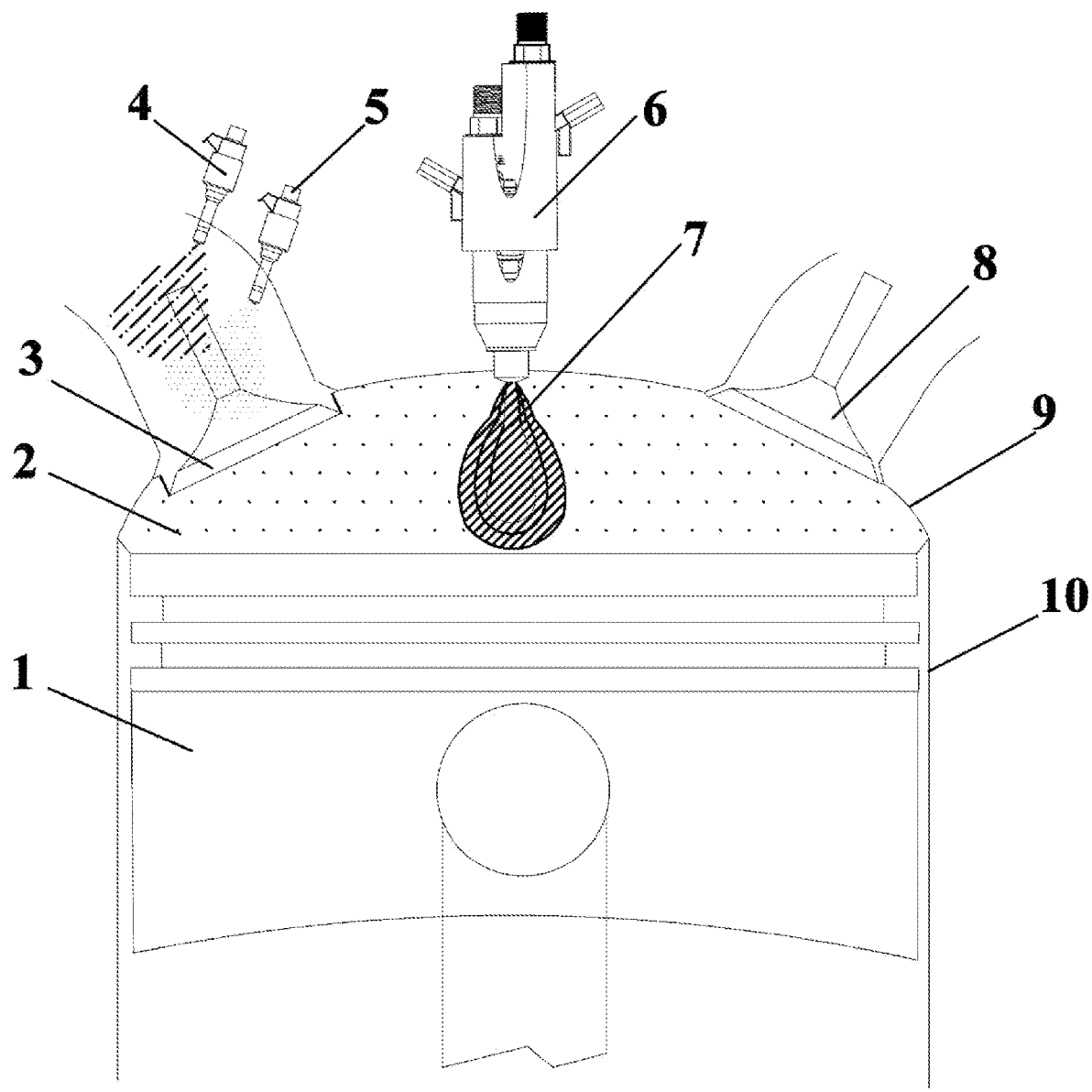
FIG. 2 is a structural schematic diagram of an ammonia-hydrogen blended fuel engine.

As shown in FIG. 2, the ammonia-hydrogen blended fuel premixed combustion engine includes a cylinder sleeve 10 and an engine cylinder head 9 arranged on the top of the cylinder sleeve 10. The top of the engine cylinder head 9 is provided with an air inlet valve 3, an exhaust valve 8 and a turbulent jet ignition device 6. The air inlet valve 3 is arranged in an air inlet pipe, the exhaust valve 8 is arranged in an exhaust channel, and the air inlet valve 3 and the exhaust valve 8 are respectively arranged on the left and right sides of the cylinder head. The cylinder sleeve 10 is internally provided with a piston 1. The air inlet valve 3 and the exhaust valve 8 are used for changing the air inflow in combination with the throttle valve of the ammonia-hydrogen blended fuel premixed combustion engine. The engine head, the turbulent jet ignition device 6 and the piston 1 jointly form the main combustion chamber 2, and the turbulent jet ignition device 6 is located right above the main combustion chamber. Wherein, an ammonia injector 4 and a first hydrogen injector 5 which face the air inlet valve 3 are respectively arranged on the air inlet pipe, and the ammonia fuel and hydrogen which are injected into the air inlet pipe form ammonia-hydrogen blended fuel in the air inlet pipe. The reactivity of the ammonia-hydrogen blended fuel is realized by adjusting the hydrogen injection amount of the first hydrogen injector 5 located in the air inlet pipe. When the hydrogen injection amount is increased, the reactivity of the ammonia-hydrogen blended fuel is increased, and conversely, the reactivity of the ammonia-hydrogen blended fuel is decreased. The first hydrogen injector 5 is regulated by the ECU and an engine fuel injection system.

Wherein, the ammonia injector 4 is a liquid ammonia low-pressure injector, and the first hydrogen injector 5 is provided with a hydrogen low-pressure nozzle.

Figure 3:
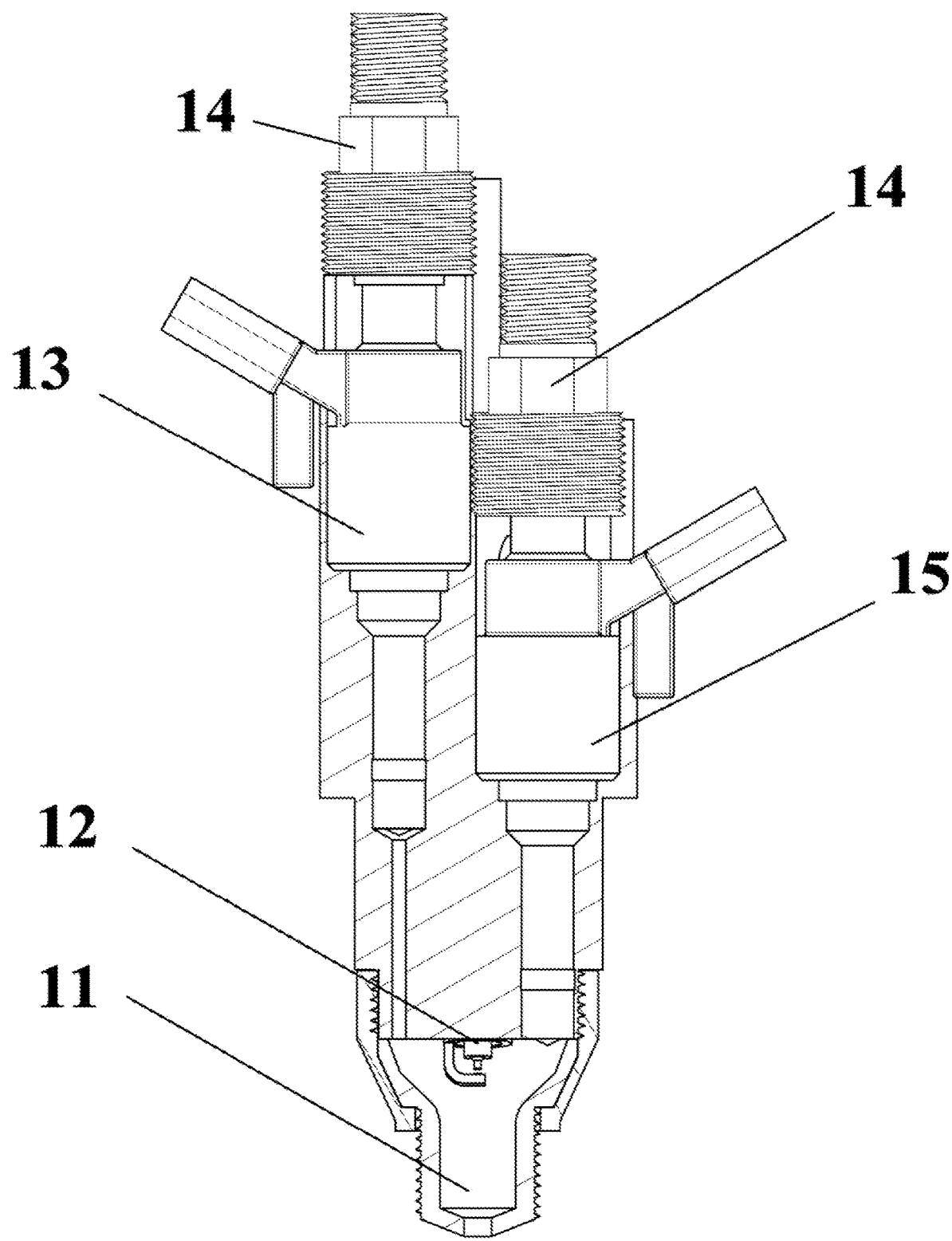
FIG. 3 is a cross-section diagram of a jet ignition device in the first embodiment.

As shown in FIG. 3, the turbulent jet ignition device 6 is a turbulent jet ignition device which is provided with a double-injection type pre-chamber and has a scavenging function. The turbulent jet ignition device 6 has two working modes, namely a double injection mode and a scavenging mode. The turbulent jet ignition device 6 includes a shell, and the bottom of the shell is installed on the engine cylinder head 9 through threads. An air injector 13 and a second hydrogen injector 15 which are vertically arranged are installed in the shell. The air injector 13 and the second hydrogen injector 15 are respectively fixed on the shell through one compression bolt 14. A through hole is formed in the compression bolt, and both ends of the compression bolt are provided with threads. One end of the compression bolt is connected with the shell through the thread for fixing the air injector 13 or the second hydrogen injector 15, and the other end of the shell is used for connecting an air path. The through hole of the compression bolt is used for feeding air into the air injector 13 or hydrogen into the second hydrogen injector 15. A pre-chamber cavity 11 is formed in the lower part of the shell. A spark plug 12 is installed on the top of the pre-chamber cavity, and the electrode of the spark plug 12 extends into the pre-chamber. The spark plug, the nozzle of the air injector and the nozzle of the second hydrogen injector are arranged on the same side of the pre-chamber. Jet holes are formed in the bottom of the shell, and the pre-chamber communicates with the main combustion chamber through the jet holes. The air injector and the second hydrogen injector are controlled and regulated by the ECU and the engine fuel injection system. The jet holes are used for accelerating the flame propagation, the combustion rate is improved, and then the economy of the engine is improved.

In combination with FIG. 1, the working process is as follows.

The ammonia fuel in the ammonia storage tank flows through the heater, the pressure stabilizing tank and the pressure controller in sequence. The ECU is used for regulating the pressure of the ammonia fuel in the pressure controller to be 0.5-1.0 MPa. Then, the ammonia fuel is divided into two paths, one part of the ammonia fuel enters the ammonia injector 4 through a pipeline, and the other part of the ammonia fuel enters the vehicle-mounted hydrogen production device in the vehicle-mounted hydrogen production unit. The hydrogen prepared by the vehicle-mounted hydrogen production device flows through the high-pressure hydrogen storage tank and the pressure controller in sequence, and the ECU regulates the pressure of the hydrogen in the pressure controller to be 1.0-2.0 MPa. And then, the hydrogen is divided into two paths, one part of the hydrogen is injected into the air inlet pipe by the first hydrogen injector 5, and the hydrogen injected from the air inlet pipe is mixed with the ammonia fuel to form the ammonia-hydrogen blended fuel in the air inlet pipe, wherein the hydrogen injection amount of the first hydrogen injector 5 is regulated by the ECU so that the ammonia-hydrogen blended fuel with adjustable reactivity can be realized in the air inlet pipe, the other part of the hydrogen is supplied to the turbulent jet ignition device 6, namely injected into the pre-chamber cavity 11 by the second hydrogen injector 15. The air injector and the second hydrogen injector respectively inject fresh air and hydrogen into the pre-chamber cavity to form equivalent gas mixture inside the pre-chamber, and then the equivalent gas mixture is ignited by the spark plug 12 to form a jet flame 7 in the main combustion chamber 2. And then, the ammonia-hydrogen blended fuel is ignited in the main combustion chamber 2 to complete combustion work. Wherein, when the ECU controls the turbulent jet ignition device to be in the double injection mode, the air injector 13 injects fresh air into the pre-chamber cavity 11. At the same time, when the ECU controls the turbulent jet ignition device to be in the scavenging mode, only the air injector 13 injects fresh air into the pre-chamber cavity to scavenge the pre-chamber. When the gas mixture in the main combustion chamber 2 is too thick or the engine works at a high EGR (Exhaust Gas Recirculation) rate, the scavenging process can eliminate the influence of ammonia or waste gas in the main combustion chamber 2 on the ignition and combustion of hydrogen and air mixture in the pre-chamber, and then the jet ignition intensity is ensured, and stable ignition of the engine is finally realized.

At the same time, engine waste heat is used for supplying heat to the vehicle-mounted hydrogen production device, and can also be supplied by an installed electric heating device. The dotted lines in FIG. 1 indicate the transmission routes of signals received or sent by the ECU.

Embodiment II

The structure is similar to that in the first embodiment, except that the structure of the turbulent jet ignition device 6 is slightly different. Only the distinguishing features are described below.

Figure 4:
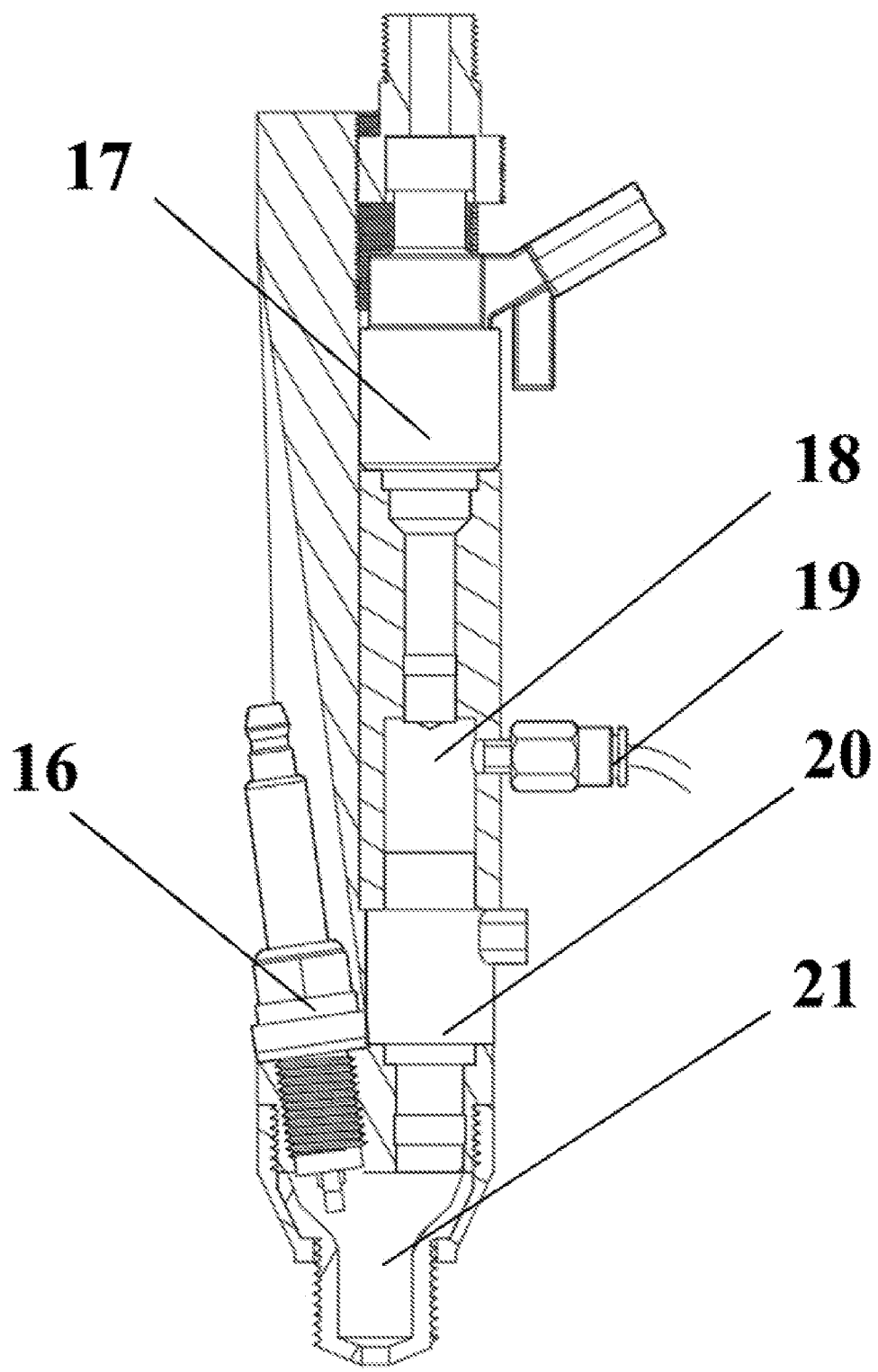
FIG. 4 is a cross-section diagram of a jet ignition device in the second embodiment.

The turbulent jet ignition device 6 is a turbulent jet ignition device which is provided with an air entrainment injection pre-chamber and has a scavenging function. The turbulent jet ignition device 6 has two working modes, namely an air entrainment injection mode and a scavenging mode. The turbulent jet ignition device includes a spark plug 16, a second hydrogen injector 17, a high-pressure premixing cavity 18, an air inlet 19, an electromagnetic valve 20 and a pre-chamber cavity 21. As shown in FIG. 4, the turbulent jet ignition device 6 includes a shell, and the bottom of the shell is installed on the engine cylinder head 9 through threads. The second hydrogen injector 17, the high-pressure premixing cavity 18 and the electromagnetic valve 20 are installed in the shell from top to bottom in sequence. The side wall of the high-pressure premixing cavity 18 communicates with the air inlet 19 for premixing high-pressure air with hydrogen from the second hydrogen injector 17. The pre-chamber cavity 21 is formed in the lower part of the shell, the spark plug 16 is installed in the shell, and the electrode of the spark plug 16 and the outlet at the bottom of the electromagnetic valve 20 extend into the pre-chamber cavity. Jet holes are formed in the bottom of the shell and used for accelerating the flame propagation, so that the combustion rate is improved, and then the economy of the engine is improved.

In the working process, when the ECU controls the turbulent jet ignition device to be in the air entrainment injection mode, a part of the hydrogen prepared from the vehicle-mounted hydrogen production device is injected into the air inlet pipe by the first hydrogen injector 5, and the other part of the hydrogen is supplied to the second hydrogen injector 17. The hydrogen from the second hydrogen injector 17 and the high-pressure air from the air inlet 19 are premixed in the high-pressure premixing cavity 18 to form equivalent homogeneous premixed gas. Then, the homogeneous premixed gas is injected into the pre-chamber cavity 21 by the electromagnetic valve 20, and then ignited by the spark plug 16 to form the jet flame 7 in the main combustion chamber 2. And then, the ammonia-hydrogen blended fuel in the main combustion chamber 2 is ignited to complete combustion work. When the ECU controls the turbulent jet ignition device to be in the scavenging mode, the electromagnetic valve injects twice, and fresh air is injected into the pre-chamber cavity 21 for the first time to scavenge the pre-chamber cavity 21. And then, hydrogen from the second hydrogen injector 17 and high-pressure air are mixed in the high-pressure premixing cavity 18 to form gas mixture, and the gas mixture is injected into the pre-chamber cavity 21 by the electromagnetic valve for the second time.

The foregoing embodiments are merely intended for describing the technical schemes of the present disclosure, but not for limiting the present disclosure. Although the present disclosure is described in detail with reference to the foregoing embodiments, a person of ordinary skill in the art should understand that they may still make modifications to the technical schemes described in the foregoing embodiments or make equivalent replacements to some or all technical features thereof, without departing from the scope of the technical solutions of the embodiments of the present disclosure, non-essential improvements and adjustments to the application made by those skilled in the art according to the foregoing application, which are all contained in the scope of protection of the present disclosure.

What is claimed is:

1. An ammonia-hydrogen blended fuel control system based on reactivity regulation, comprising a vehicle-mounted ammonia-hydrogen fuel supply system, an ammonia-hydrogen blended fuel premixed combustion engine and an electronic control unit (ECU), wherein the ECU is configured for controlling the ammonia-hydrogen blended fuel premixed combustion engine and the vehicle-mounted ammonia-hydrogen fuel supply system and regulating injection quantities and pressure values of ammonia fuel and hydrogen to be fed into the ammonia-hydrogen blended fuel premixed combustion engine;

the vehicle-mounted ammonia-hydrogen fuel supply system comprises a low-pressure liquid ammonia supply unit and a vehicle-mounted hydrogen production unit, and is configured for providing the ammonia fuel and the hydrogen for the ammonia-hydrogen blended fuel premixed combustion engine, wherein the low-pressure liquid ammonia supply unit is configured for providing the ammonia fuel with a pressure range of 0.5-1.0 MPa, and the vehicle-mounted hydrogen production unit is configured for providing the hydrogen with a pressure range of 1.0-2.0 MPa; wherein the low-pressure liquid ammonia supply unit comprises an ammonia storage tank, a heater, a pressure stabilizing tank and a pressure controller which are connected in sequence, and the ammonia storage tank is filled with liquid ammonia; and the vehicle-mounted hydrogen production unit comprises a vehicle-mounted hydrogen generator, a high-pressure hydrogen storage tank and a pressure controller which are connected in sequence;

the ammonia-hydrogen blended fuel premixed combustion engine comprises an engine cylinder head, a cylinder sleeve, a piston, a main combustion chamber, an air inlet pipe, an exhaust channel, an ammonia injector and a first hydrogen injector, and also comprises a turbulent jet ignition device arranged on the engine cylinder head and provided with a pre-chamber, wherein the ammonia injector and the first hydrogen injector which face the engine cylinder head are respectively arranged on the air inlet pipe, and the ammonia fuel and hydrogen which are injected into the air inlet pipe form ammonia-hydrogen blended fuel in the air inlet pipe; the turbulent jet ignition device is configured for realizing a double injection mode of air and hydrogen injection alone and a scavenging mode of air injection alone, or an air entrainment injection mode of hydrogen-air mixture injection and a scavenging mode of hydrogen-air mixture injection; the turbulent jet ignition device comprises a pre-chamber cavity and a spark plug;

in a working process of the ammonia-hydrogen blended fuel control system, the low-pressure liquid ammonia supply unit provides the ammonia fuel with the pressure range of 0.5-1.0 MPa under the regulation of the ECU, and then the ammonia fuel is divided into two parts, one part of the ammonia fuel enters the ammonia injector through a pipeline, and another part of the ammonia fuel enters the vehicle-mounted hydrogen production unit to participate in hydrogen production; and the vehicle-mounted hydrogen production unit provides the hydrogen with the pressure range of 1.0-2.0 MPa under the regulation of the ECU, and then the hydrogen is divided into two parts, one part of the hydrogen is injected into the air inlet pipe by the first hydrogen injector, and the hydrogen injected into the air inlet pipe is mixed with the ammonia fuel to form the ammonia-hydrogen blended fuel in the air inlet pipe, wherein a hydrogen injection amount of the first hydrogen injector is regulated by the ECU so that the ammonia-hydrogen blended fuel can be realized in the air inlet pipe, and another part of the hydrogen is supplied to the turbulent jet ignition device and ignited by the spark plug in the pre-chamber cavity to form a jet flame in the main combustion chamber, and then the ammonia-hydrogen blended fuel is ignited in the main combustion chamber to complete combustion work.

2. The ammonia-hydrogen blended fuel control system based on reactivity regulation according to claim 1, wherein an air inlet valve is arranged in the air inlet pipe, an exhaust valve is arranged in the exhaust channel, and the air inlet valve and the exhaust valve are respectively arranged on the left and right sides of the engine cylinder head, and the air inlet valve and the exhaust valve are configured for changing an air inflow in combination with a throttle valve of the ammonia-hydrogen blended fuel premixed combustion engine.

3. The ammonia-hydrogen blended fuel control system based on reactivity regulation according to claim 1, wherein the turbulent jet ignition device further comprises an air injector and a second hydrogen injector; a nozzle of the air injector extends into the pre-chamber cavity for injecting air into the pre-chamber cavity, and a nozzle of the second hydrogen injector extends into the pre-chamber cavity for injecting hydrogen into the pre-chamber cavity; the spark plug, the nozzle of the air injector and the nozzle of the second hydrogen injector are arranged on a same side of the pre-chamber; jet holes are positioned in a bottom of the turbulent jet ignition device, and the pre-chamber cavity communicates with the main combustion chamber through the jet holes; and the turbulent jet ignition device has two working modes, namely the double injection mode and the scavenging mode of air injection alone;

when the ECU controls the turbulent jet ignition device to be in the double injection mode, the air injector and the second hydrogen injector respectively inject fresh air and hydrogen into the pre-chamber cavity for forming equivalent gas mixture inside the pre-chamber; and when the ECU controls the turbulent jet ignition device to be in the scavenging mode of air injection alone, only the air injector injects fresh air into the pre-chamber cavity to scavenge the pre-chamber.

4. The ammonia-hydrogen blended fuel control system based on reactivity regulation according to claim 1, wherein the turbulent jet ignition device further comprises a second hydrogen injector; the second hydrogen injector is provided with a high-pressure premixing cavity and an electromagnetic valve in sequence downward, and a nozzle at a bottom of the electromagnetic valve extends into the pre-chamber cavity for injecting hydrogen into the pre-chamber cavity; a side wall of the high-pressure premixing cavity communicates with an air inlet for premixing high-pressure air with hydrogen from the second hydrogen injector; a nozzle of the spark plug extends into the pre-chamber cavity; jet holes are positioned in a bottom of the turbulent jet ignition device, and the pre-chamber cavity communicates with the main combustion chamber through the jet holes; the turbulent jet ignition device has two working modes, namely, the air entrainment injection mode and the scavenging mode of hydrogen-air mixture injection;

when the ECU controls the turbulent jet ignition device to be in the air entrainment injection mode, hydrogen from the second hydrogen injector and high-pressure air are mixed in the high-pressure premixing cavity, and then gas mixture of air and hydrogen is injected by the electromagnetic valve to form equivalent gas mixture in the pre-chamber;

when the ECU controls the turbulent jet ignition device to be in the scavenging mode of hydrogen-air mixture injection, the electromagnetic valve injects twice, and fresh air is injected into the pre-chamber cavity for the first time to scavenge the pre-chamber; and then, hydrogen from the second hydrogen injector and high-pressure air are mixed in the high-pressure premixing cavity to form gas mixture, and the gas mixture is injected into the pre-chamber by the electromagnetic valve for the second time.

5. The ammonia-hydrogen blended fuel control system based on reactivity regulation according to claim 1, wherein the ammonia injector is a liquid ammonia low-pressure injector, and the first hydrogen injector is provided with a hydrogen low-pressure nozzle.

6. The ammonia-hydrogen blended fuel control system based on reactivity regulation according to claim 1, wherein the vehicle-mounted hydrogen generator is heated by waste heat of the ammonia-hydrogen blended fuel premixed combustion engine, or an electric heating device configured for heat supply.

\* \* \* \* \*